United States Patent
Li et al.

(10) Patent No.: US 9,979,526 B2
(45) Date of Patent: May 22, 2018

(54) METHODS AND APPARATUSES FOR MEASURING CSI

(71) Applicant: ZTE Corporation, Shenzhen (CN)

(72) Inventors: Weimin Li, Shenzhen (CN); Yu Ngok Li, Shenzhen (CN); Peng Hao, Shenzhen (CN); Lu Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 161 days.

(21) Appl. No.: 14/761,768

(22) PCT Filed: Dec. 30, 2013

(86) PCT No.: PCT/CN2013/090949
§ 371 (c)(1),
(2) Date: Jul. 17, 2015

(87) PCT Pub. No.: WO2014/110974
PCT Pub. Date: Jul. 24, 2014

(65) Prior Publication Data
US 2015/0358139 A1   Dec. 10, 2015

(30) Foreign Application Priority Data

Jan. 18, 2013   (CN) .......................... 2013 1 0026298

(51) Int. Cl.
*H04W 4/00*   (2018.01)
*H04L 5/00*   (2006.01)
(Continued)

(52) U.S. Cl.
CPC .......... *H04L 5/0055* (2013.01); *H04L 5/0057* (2013.01); *H04W 24/08* (2013.01);
(Continued)

(58) Field of Classification Search
CPC ..... H04L 43/06; H04L 65/4076; H04L 65/60; H04L 65/608; H04L 65/80;
(Continued)

(56) References Cited

U.S. PATENT DOCUMENTS 6,975,653 B2 * 12/2005 Eidson ................. H04J 3/0664
370/503
9,673,970 B1 * 6/2017 Aweya ................. H04W 36/30
(Continued)

FOREIGN PATENT DOCUMENTS

CN   102281638 A   12/2011
CN   102340379 A   2/2012
(Continued)

OTHER PUBLICATIONS

International Search Report for corresponding application PCT/CN2013/090949 filed Dec. 30, 2013; dated Mar. 27, 2017.
(Continued)

*Primary Examiner* — Thai Hoang
(74) *Attorney, Agent, or Firm* — Cantor Colburn LLP

(57) ABSTRACT

Provided are methods and apparatuses for measuring CSI. The method comprises: a terminal device determining whether a subframe a channel state information interference measurement resource is located on is a downlink subframe; when the subframe where the channel state information interference measurement resource is located is a downlink subframe, the terminal device executing interference measurement by using the channel state information interference measurement resource. By means of the present disclosure, the technical problem is solved that it is difficult to effectively perform the CSI measurement caused when a base station flexibly adjust uplink-downlink configuration in a related technology, thereby achieving the technical effect of improving the data transmission performance of a system.

25 Claims, 8 Drawing Sheets

A terminal device determines whether a subframe where a channel state information interference measurement resource is located is a downlink subframe — S502

When the subframe where the channel state information interference measurement resource is located is a downlink subframe, then the terminal device executes interference measurement by using the channel state information interference measurement resource — S504

(51) Int. Cl.
   *H04W 24/08* (2009.01)
   *H04W 72/08* (2009.01)
   *H04W 72/12* (2009.01)
   *H04W 74/00* (2009.01)

(52) U.S. Cl.
   CPC ......... *H04W 72/08* (2013.01); *H04W 72/082* (2013.01); *H04W 72/085* (2013.01); *H04W 72/1273* (2013.01); *H04W 74/004* (2013.01)

(58) Field of Classification Search
   CPC . H04L 12/1881; H04L 69/166; H04L 69/163; H04W 24/10
   USPC .......................... 370/503–520; 375/354–368
   See application file for complete search history.

(56) References Cited

U.S. PATENT DOCUMENTS

| | | | | |
|---|---|---|---|---|
| 2007/0030821 | A1* | 2/2007 | Iwamura | H04L 29/06027 370/328 |
| 2007/0147435 | A1* | 6/2007 | Hamilton | G06F 1/14 370/503 |
| 2007/0213038 | A1* | 9/2007 | Masseroni | H04L 29/06027 455/414.3 |
| 2007/0250625 | A1* | 10/2007 | Titus | H04L 41/0213 709/224 |
| 2008/0069002 | A1* | 3/2008 | Savoor | H04L 29/06027 370/241 |
| 2010/0135171 | A1* | 6/2010 | Jung | H04L 41/5009 370/252 |
| 2012/0243555 | A1* | 9/2012 | Yang | H04L 65/1043 370/464 |
| 2013/0083808 | A1* | 4/2013 | Sridhar | H04L 65/605 370/475 |
| 2013/0208079 | A1* | 8/2013 | Yassur | H04L 65/608 348/14.09 |
| 2014/0256343 | A1* | 9/2014 | Shaikh | H04W 28/22 455/452.2 |
| 2016/0173347 | A1* | 6/2016 | Rajapakse | H04L 43/06 709/224 |

FOREIGN PATENT DOCUMENTS

| | | |
|---|---|---|
| CN | 102368697 A | 3/2012 |
| CN | 102612056 A | 7/2012 |
| WO | 2012045770 A1 | 4/2012 |
| WO | 2012099319 A1 | 7/2012 |
| WO | 2012167431 A1 | 12/2012 |

OTHER PUBLICATIONS

Supplemental European Search Report Application No. EP 13871553; dated Jan. 8, 2016; pp. 8.

* cited by examiner

METHODS AND APPARATUSES FOR MEASURING CSI

TECHNICAL FIELD

The disclosure relates to the field of communications, in particular to methods and apparatuses for measuring channel state information (CSI).

BACKGROUND

According to technical specification of 3GPP TS 36.211, the frame structure of a long term evolution (LTE) time division duplex (TDD) system is as shown in FIG. 1. The length of one radio frame is Tf=307200 Ts=10 ms, including two half-frames with the length being 5 ms, wherein each half-frame is composed of 5 subframes of which the length is 1 ms. The uplink-downlink configuration supported by the frame structure is as shown in table 1, wherein D represents that that a subframe is used for downlink transmission, U represents that the subframe is used for uplink transmission, and S represents a special subframe which contains three special time slots, wherein the three special time slots respectively are: a downlink pilot time slot (DwPTS) for downlink transmission, a guard period (GP) and an uplink pilot time slot (UpPTS) for uplink transmission.

TABLE 1

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

At present, in an LTE TDD system, the base station (for example, an evolved node B, i.e. eNodeB, referred to as eNB) of each cell sends uplink-downlink configuration information to terminals through a broadcast message. In order to control inter-cell interference, the base station of each cell usually uses the same uplink-downlink configuration. Therefore, when performing downlink transmission, a base station is mainly affected by the interference generated by downlink transmission of other base stations; and when performing uplink transmission, a terminal is mainly affected by the interference generated by uplink transmission of terminals in other cells.

TDD eIMTA (enhanced Interference Management and Traffic Adaptation, eIMTA) allows a base station to flexibly adjust uplink-downlink configuration according to the traffic load variation of the serving cell. When base stations of different cells have different uplink-downlink configurations, the interference on different subframes when a base station performs downlink transmission or a terminal performs uplink transmission may have significant variations. For example, as shown in FIG. 2(a), an eNB1 respectively uses uplink-downlink configuration Config. 0 (configuration 0) and Config. 2 in Radio frame #1 (Radio frame 1) and Radio frame #2; while as shown in FIG. 2(b), an eNB2 respectively uses uplink-downlink configuration Config. 2 and Config. 1 in Radio frame #1 and Radio frame #2.

Therefore, when the eNB2 performs downlink transmission in subframes 0/1/5/6 of Radio frame #1 and subframe 0/1/4/5/6/9 of Radio frame #2, the downlink transmission performed by the eNB2 will be affected by the interference of the downlink transmission performed by the eNB1 in corresponding subframes; likewise, when the eNB2 performs downlink transmission in subframes 3/4/8/9 of the Radio frame #1, the downlink transmission performed by the eNB2 will be affected by the interference of uplink transmission performed by a terminal in a eNB1 service cell. Therefore, when the eNB2 performs downlink transmission, the interference situation on subframes 3/4/8/9 of Radio frame #1 may be significantly different from the interference situations on subframes 0/1/5/6 of Radio frame #1 and subframe 0/1/4/5/6/9 of Radio frame #2. The interference situations on subframes 3/4/8/9 of Radio frame #1 are relevant to the factors such as an uplink transmission power of a terminal in the interference source cell, and/or a distance between the terminal in the interference source cell and the terminal in the interfered cell.

An LTE system supports performing interference measurement by configuring a channel state information interference measurement resource (for example, a channel state information-interference measurement resource, referred to as a CSI-IM resource, which is configured based on a zero-power channel state information reference signal) so as to obtain a measurement and report of CSI. For example, as shown in FIG. 3, the uplink-downlink configurations of eNB1 and eNB2 are the same as that in FIG. 2; the eNB2 configures a set of CSI-IM resources (i.e. I in FIG. 3) on subframes 0 and 5 of each radio frame for a terminal to execute interference measurement with a period of 5 ms to acquire interference information containing interference generated by eNB1 downlink transmission, so as to acquire and report the CSI reflecting a channel situation for link adaptation transmission.

Or, as shown in FIG. 4, the uplink-downlink configurations of the eNB1 and eNB2 are the same as that of FIG. 2; the eNB2 configures two sets of CSI-IM resources (i.e. I1 and I2 in FIG. 4) on subframes 0 and 5 of each radio frame for the terminal to execute interference measurement with a period of 5 ms; the eNB1 also configures a CSI-IM resource at a time-frequency resource location which is the same as that of the first set of CSI-IM resources configured by the eNB2, and in this way, a terminal acquiring a service from the eNB2 may acquire, through the first set of CSI-IM resources, interference information not containing the interference generated by eNB1 downlink transmission, and acquire, through the second set of CSI-IM resource, interference information containing interference generated by eNB1 downlink transmission, so as to acquire and report two sets of CSI reflecting different channel situations for link adaptation transmission or coordinated multi-point transmission.

However, in TDD eIMTA, acquiring CSI through the above-mentioned CSI measurement and report method cannot effectively reflect the significant variations of the interference on different subframes in which a base station performing downlink transmission when a base station of a cell flexibly adjusts uplink-downlink configuration. For example, the configuration period of the CSI-IM resource in the related art is a multiple of 5 ms, and limited to this, the above-mentioned CSI measurement and report method cannot acquire CSI reflecting the interference situation on subframes 3/4/8/9 of the Radio frame #1 in which eNB2 performs downlink transmission as shown in FIG. 2 at the same time.

Another existing problem is that the change of uplink-downlink configuration used by a base station will cause the change of the transmission direction of a subframe configured with a channel state information-interference measurement resource by the base station, then if the terminal does not judge the transmission direction of the subframe to learn whether the subframe where the channel state information-interference measurement resource is located is a downlink subframe, a situation that the terminal performs interference measurement on a non-downlink subframe may happen, thereby causing the terminal executing an interference measurement operation on the subframe to be failed or an acquired interference measurement result to be inaccurate.

Aiming at the above-mentioned problems, no effective solution has been presented at present.

SUMMARY

The embodiments of the disclosure provide methods and apparatuses for measuring CSI so as to at least solve the technical problem in the related art that CSI measurement cannot be effectively carried out due to a base station flexibly adjusting uplink-downlink configuration.

According to one aspect of the embodiments of the disclosure, a method for measuring CSI is provided, including: a terminal device determining whether a subframe where a channel state information interference measurement resource is located is a downlink subframe; when the subframe where the channel state information interference measurement resource is located is a downlink subframe, the terminal device executing interference measurement by using the channel state information interference measurement resource.

In an example embodiment, the terminal device determines whether the subframe where the channel state information interference measurement resource is located is a downlink subframe through at least one of the following manners: the terminal device determining whether the subframe where the channel state information interference measurement resource is located is the downlink subframe according to uplink-downlink configuration information received from a network side device; the terminal device determining whether the subframe where the channel state information interference measurement resource is located is the downlink subframe according to downlink scheduling information which is received from the network side device and corresponding to the subframe where the channel state information interference measurement resource is located; the terminal device determining whether the subframe where the channel state information interference measurement resource is located is the downlink subframe according to a downlink control channel on the subframe where the channel state information interference measurement resource received from the network side device is located; and the terminal device determining whether the subframe where the channel state information interference measurement resource is located is the downlink subframe according to CSI measurement report trigger information which is received from the network side device and corresponding to the subframe where the channel state information interference measurement resource is located.

In an example embodiment, before a terminal device determines whether the subframe where the channel state information interference measurement resource is located is a downlink subframe, the above-mentioned method further includes: the terminal device receiving configuration information sent by a network side device, wherein the configuration information is used for indicating channel state information interference measurement resources configured for multiple subframe groups by the network side device, and each subframe group in the multiple subframe groups includes one or more subframes.

In an example embodiment, the multiple subframe groups include: a first subframe group and a second subframe group.

In an example embodiment, the first subframe group includes one or more downlink subframes of which a transmission direction is fixed to be downlink, and the second subframe group includes one or more subframes of which a transmission direction allows to be adjusted; or, the first subframe group includes one or more subframes which are configured to be one or more downlink transmission subframes by a current network side device, wherein one or more subframes at a location corresponding to the one or more downlink transmission subframes are also configured to be one or more downlink transmission subframes by a network side device of which the distance between this network side device and the current network side device is less than a preset threshold value; and the second subframe group includes one or more subframes which are configured to be one or more downlink transmission subframes by a current network side device, wherein one or more subframes at a location corresponding to the one or more downlink transmission subframes are configured to be one or more uplink transmission subframes by a network side device of which the distance between this network side device and the current network side device is less than the preset threshold value; or, the first subframe group includes one or more downlink subframes on which channel state information measured and reported by a terminal device is less than a preset threshold, and the second subframe group includes one or more downlink subframes on which channel state information measured and reported by the terminal device is more than the preset threshold.

In an example embodiment, the channel state information interference measurement resources configured for the multiple subframe groups of the terminal device by the network side device include at least one of the following: periodic channel state information interference measurement resources configured for different subframe groups in the multiple subframe groups by the network side device; and aperiodically triggered channel state information interference measurement resources configured for different subframe groups in the multiple subframe groups by the network side device.

In an example embodiment, the aperiodically triggered channel state information interference measurement resources configured for different subframe groups in the multiple subframe groups are configured by the network side device according to CSI measurement report trigger information.

In an example embodiment, the CSI measurement report trigger information includes: a channel state information request (CSI request) in downlink control information (DCI).

In an example embodiment, the channel state information interference measurement resources configured for multiple subframe groups of the terminal device by the network side device include: the channel state information interference measurement resources configured for different subframe groups in the multiple subframe groups by the network side device are located in different subframes.

In an example embodiment, the channel state information interference measurement resources configured for different subframe groups in the multiple subframe groups by the network side device are located in different subframes which are indicated by different subframe offsets.

In an example embodiment, in a case where the multiple subframe groups are determined by the network side device in a semi-static manner, the multiple subframe groups are determined by the network side device in a period of multiple radio frames; and in a case where the multiple subframe groups are determined by the network side device in a dynamic manner, the multiple subframe groups are determined by the network side device in a period of one radio frame.

In an example embodiment, in the case where the multiple subframe groups are determined by the network side device in the semi-static manner, the multiple subframe groups configured by the network side device for each radio frame in the multiple radio frames are the same.

In an example embodiment, the configuration information is further used for indicating one or more subframes configured with a channel state information interference measurement resource in each subframe group of the multiple subframe groups, and/or indicating a subframe group to which each subframe configured with the channel state information interference measurement resource belongs.

In an example embodiment, the terminal device executing interference measurement by using the channel state information interference measurement resource includes: the terminal device executing the interference measurement by using the channel state information interference measurement resource; and the terminal device determining a subframe group to which a subframe where the channel state information interference measurement resource is located belongs according to the configuration information, and using the measurement result obtained by executing the interference measurement as a measurement result of the determined subframe group.

In an example embodiment, after the terminal device determines the subframe group to which the subframe where the channel state information interference measurement resource is located belongs according to the configuration information, and uses the measurement result obtained by executing the interference measurement as the measurement result of the determined subframe group, the method further includes: the terminal device determining CSI corresponding to the subframe group to which the subframe where the channel state information interference measurement resource is located belongs according to the measurement result; and the terminal device sending the CSI to a network side device.

In an example embodiment, the terminal device sending the CSI to the network side device includes one of the following: the terminal device sending the CSI to the network side device through a physical uplink control channel (PUCCH) or physical uplink shared channel (PUSCH) on an uplink subframe providing ACK/NACK feedback for downlink transmission of a subframe where the channel state information interference measurement resource is located; the terminal device sending the CSI to the network side device through a PUCCH or PUSCH on the first uplink subframe which locates after a subframe where the channel state information interference measurement resource is located and of which an interval between this uplink subframe and the subframe where the channel state information interference measurement resource is located is greater than or equal to n, where n is a natural number greater than or equal to 3; and the terminal device assuming the subframe where the channel state information interference measurement resource is located as an uplink subframe, and the terminal device sending the CSI to the network side device through the PUCCH or PUSCH on an uplink retransmission subframe corresponding to this subframe.

In an example embodiment, the channel state information interference measurement resource is a channel state information-interference measurement (CSI-IM) resource configured based on a zero-power channel state information reference signal.

According to another aspect of the embodiments of disclosure, a method for measuring channel state information (CSI) is provided, including: a network side device configuring channel state information interference measurement resources for multiple subframe groups; and the network side device sending configuration information to a terminal device, wherein the configuration information is used for instructing the terminal device to execute interference measurement when a subframe where a channel state information interference measurement resource is located is a downlink subframe.

In an example embodiment, the multiple subframe groups include: a first subframe group and a second subframe group.

In an example embodiment, the first subframe group includes one or more downlink subframes of which a transmission direction is fixed to be downlink, and the second subframe group includes one or more subframes of which a transmission direction allows to be adjusted; or, the first subframe group includes one or more subframes which are configured to be one or more downlink transmission subframes by a current network side device, wherein one or more subframes at a location corresponding to the one or more downlink transmission subframes are also configured to be one or more downlink transmission subframes by a network side device of which the distance between this network side device and the current network side device is less than a preset threshold value; and the second subframe group includes one or more subframes which are configured to be one or more downlink transmission subframes by a current network side device, wherein one or more subframes at a location corresponding to the one or more downlink transmission subframes are configured to be one or more uplink transmission subframes by a network side device of which the distance between this network side device and the current network side device is less than the preset threshold value; or, the first subframe group includes one or more downlink subframes on which channel state information measured and reported by a terminal device is less than a preset threshold, and the second subframe group includes one or more downlink subframes on which channel state information measured and reported by the terminal device is more than the preset threshold.

In an example embodiment, the network side device configuring the channel state information interference measurement resources for the multiple subframe groups includes at least one of the following: the network side device configuring periodic channel state information interference measurement resources for different subframe groups in the multiple subframe groups; and the network side device configuring aperiodically triggered channel state information interference measurement resources for different subframe groups in the multiple subframe groups.

In an example embodiment, the network side device configures the aperiodically triggered channel state information interference measurement resources for different subframe groups in the multiple subframe groups according to CSI measurement report trigger information.

In an example embodiment, the network side device configuring the channel state information interference measurement resources for the multiple subframe groups includes: the network side device configuring channel state information interference measurement resources located in different subframes for different subframe groups in the multiple subframe groups.

In an example embodiment, the network side device indicates that channel state information interference measurement resources corresponding to different subframe groups in the multiple subframe groups are located in different subframes by using different subframe offsets.

In an example embodiment, in a case of determining the multiple subframe groups in a semi-static manner, the network side device determines the multiple subframe groups in a period of multiple radio frames; and in a case of determining the multiple subframe groups in a dynamic manner, the network side device determines the multiple subframe groups in a period of one radio frame.

In an example embodiment, the configuration information is further used for indicating one or more subframes configured with a channel state information interference measurement resource in each subframe group of the multiple subframe groups, and/or indicating a subframe group to which each subframe configured with the channel state information interference measurement resource belongs.

In an example embodiment, the channel state information interference measurement resource is a channel state information-interference measurement (CSI-IM) resource configured based on a zero-power channel state information reference signal.

According to another aspect of the embodiments of disclosure, an apparatus for measuring channel state information (CSI) is provided, which is located in a terminal device and includes: a determination element, configured to determine whether a subframe where a channel state information interference measurement resource is located is a downlink subframe; and an execution element, configured to execute interference measurement by using the channel state information interference measurement resource when a determination result of the determination element is that the subframe where the channel state information interference measurement resource is located is a downlink subframe.

In an example embodiment, the determination element is configured to determine whether the subframe where the channel state information interference measurement resource is located is a downlink subframe through at least one of the following manners: determining whether the subframe where the channel state information interference measurement resource is located is the downlink subframe according to uplink-downlink configuration information received from a network side device; determining whether the subframe where the channel state information interference measurement resource is located is the downlink subframe according to downlink scheduling information which is received from the network side device and corresponding to the subframe where the channel state information interference measurement resource is located; determining whether the subframe where the channel state information interference measurement resource is located is the downlink subframe according to a downlink control channel on the subframe where the channel state information interference measurement resource received from the network side device is located; and determining whether the subframe where the channel state information interference measurement resource is located is the downlink subframe according to CSI measurement report trigger information which is received from the network side device and corresponding to the subframe where the channel state information interference measurement resource is located.

In an example embodiment, the above-mentioned apparatus further includes: a reception element, configured to receive configuration information sent by a network side device before determining whether the subframe where the channel state information interference measurement resource is located is a downlink subframe, wherein the configuration information is used for indicating channel state information interference measurement resources configured for multiple subframe groups by the network side device, and each subframe group in the multiple subframe groups includes one or more subframes.

In an example embodiment, the channel state information interference measurement resource is a channel state information-interference measurement (CSI-IM) resource configured based on a zero-power channel state information reference signal.

According to another aspect of the embodiments of disclosure, an apparatus for measuring channel state information (CSI) is provided, which is located in a network side device and includes: a configuration element, configured to configure channel state information interference measurement resources for multiple subframe groups; and a sending element, configured to send configuration information to a terminal device, wherein the configuration information is used for instructing the terminal device to execute interference measurement when a subframe where a channel state information interference measurement resource is located is a downlink subframe.

In an example embodiment, the above-mentioned apparatus further includes: a grouping element, wherein the grouping element includes: a first grouping component, configured to determine, in a case of determining the multiple subframe groups in a semi-static manner, the multiple subframe groups in a period of multiple radio frames; and a second grouping component, configured to determine, in a case of determining the multiple subframe groups in a dynamic manner, the multiple subframe groups in a period of one radio frame.

In an example embodiment, the channel state information interference measurement resource is a channel state information-interference measurement (CSI-IM) resource configured based on a zero-power channel state information reference signal.

In the embodiments of the disclosure, the terminal device firstly determines whether a subframe where a channel state information interference measurement resource is located is a downlink subframe, and only in the case of determining that the subframe where the channel state information interference measurement resource is located is a downlink subframe, will the terminal execute interference measurement on the channel state information interference measurement resource. By means of the above-mentioned manner, the technical problem that it is difficult to effectively perform the CSI measurement caused when a base station flexibly adjust uplink-downlink configuration in a related technology is solved, thereby achieving the technical effect of improving the data transmission performance of a system.

BRIEF DESCRIPTION OF THE DRAWINGS

Drawings, provided for further understanding of the present disclosure and forming a part of the specification, are used to explain the present disclosure together with embodiments of the present disclosure rather than to limit the present disclosure. In the accompanying drawings.

DESCRIPTION OF EMBODIMENTS

A detailed description is given to the embodiments of the disclosure with reference to the accompanying drawings. It should be noted that the embodiments and the characteristics of the embodiments can be combined with each other if no conflict is caused.

Figure 5:
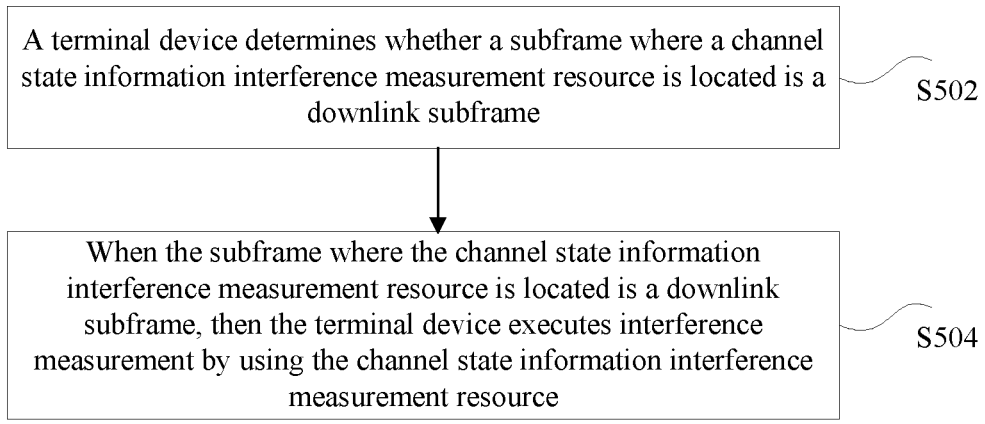
FIG. 5 is an example flowchart of a method for measuring CSI according to an embodiment of the disclosure.

An embodiment of the present disclosure provides an example method for measuring CSI, which is described from a terminal device side. As shown in FIG. 5, the method includes the following steps:

step S502: a terminal device determines whether a subframe where a channel state information interference measurement resource is located is a downlink subframe;

step S504: when the subframe where the channel state information interference measurement resource is located is a downlink subframe, then the above-mentioned terminal device executes interference measurement by using the above-mentioned channel state information interference measurement resource.

In the example embodiment, the terminal device firstly determines whether a subframe where the channel state information interference measurement resource is located is a downlink subframe, and only in the case of determining that the subframe where the channel state information interference measurement resource is located is a downlink subframe, will the terminal execute interference measurement on the channel state information interference measurement resource. By means of the above-mentioned manner, the technical problem that it is difficult to effectively perform the CSI measurement caused when a base station flexibly adjust uplink-downlink configuration in a related technology is solved, thereby achieving the technical effect of improving the data transmission performance of a system.

Figure 6:
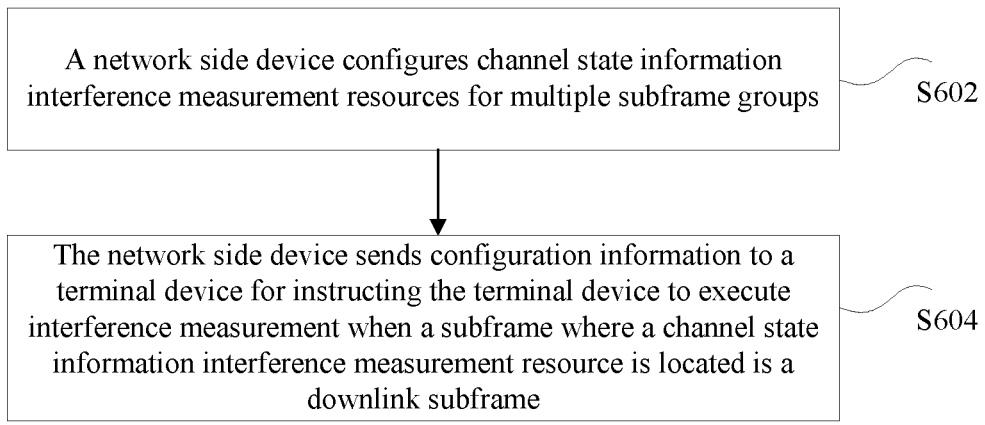
FIG. 6 is another example flowchart of a method for measuring CSI according to an embodiment of the disclosure.

An embodiment of the disclosure further provides an example method for measuring CSI, which is described from a network side device. As shown in FIG. 6, the method includes the following steps:

step S602: a network side device configures channel state information interference measurement resources for multiple subframe groups; and step S604: the network side device sends configuration information to a terminal device for instructing the terminal device to execute interference measurement when a subframe where a channel state information interference measurement resource is located is a downlink subframe.

The embodiments of the disclosure further provide several example manners for determining whether a subframe where a channel state information interference measurement resource is located is a downlink subframe:

1) a terminal device determines whether the subframe where the channel state information interference measurement resource is located is the downlink subframe according to uplink-downlink configuration information received from a network side device;

2) the terminal device determines whether the subframe where the channel state information interference measurement resource is located is the downlink subframe according to downlink scheduling information which is received from the network side device and corresponding to the subframe where the channel state information interference measurement resource is located;

3) the terminal device determines whether the subframe where the channel state information interference measurement resource is located is the downlink subframe according to a downlink control channel on the subframe where the channel state information interference measurement resource received from the network side device is located; and as an example embodiment, the terminal device may determine whether the subframe where the channel state information interference measurement resource is located is the downlink subframe according to a physical downlink control channel (PDCCH) on the subframe where the channel state information interference measurement resource received from the network side device is located; and/or 4) the terminal device determines whether the subframe where the channel state information interference measurement resource is located is the downlink subframe according to CSI measurement report trigger information which is received from the network side device and corresponding to the subframe where the channel state information interference measurement resource is located, wherein the CSI measurement report trigger information may include a channel state information request (CSI request) in downlink control information (DCI).

In an example embodiment, before a terminal device determines whether a subframe where the channel state information interference measurement resource is located is a downlink subframe, the above-mentioned method may further include: the terminal device receives configuration information sent by a network side device, wherein the configuration information is used for indicating channel state information interference measurement resources configured for multiple subframe groups by the network side device, and each subframe group in the multiple subframe groups includes one or more subframes.

In an example embodiment, the above-mentioned configuration information is further used for indicating one or more subframes configured with a channel state information interference measurement resource in each subframe group of the multiple subframe groups, and/or indicating a subframe group to which each subframe configured with the channel state information interference measurement resource belongs. Thus, the terminal device may effectively determine a subframe group to which a channel state information interference measurement resource belongs and realize effective judgement on the location of the channel state information interference measurement resource.

The following uses that multiple subframe groups are specifically two subframe groups as an example for description, wherein the two subframe groups include: a first subframe group and a second subframe group. The present embodiment lists several composition manners of the first subframe group and the second subframe group:

1) the first subframe group includes one or more downlink subframes of which a transmission direction is fixed to be downlink, and the second subframe group includes one or more subframes of which a transmission direction allows to be adjusted; or, 2) the first subframe group includes one or more subframes which are configured to be one or more downlink transmission subframes by a current network side device, wherein one or more subframes at a location corresponding to the one or more downlink transmission subframes are also configured to be one or more downlink transmission subframes by a network side device of which the distance between this network side device and the current network side device is less than a preset threshold value, and the second subframe group includes one or more subframes which are configured to be one or more downlink transmission subframes by a current network side device, wherein one or more subframes at a location corresponding to the one or more downlink transmission subframes are configured to be one or more uplink transmission subframes by a network side device of which the distance between this network side device and the current network side device is less than the preset threshold value; or, 3) the first subframe group includes one or more downlink subframes on which channel state information measured and reported by a terminal device is less than a preset threshold, and the second subframe group includes one or more downlink subframes on which channel state information measured and reported by the terminal device is more than the preset threshold. In an example embodiment, channel state information in the above-mentioned measurement report may be an inter-cell interference value carried therein, and also may be a modulation coding scheme. When the channel state information in the measurement report is the modulation coding scheme, the implementation manner may be: a system presets multiple modulation coding schemes, and an index is provided for each modulation coding scheme, and then the subframe groups are divided according the index and the preset threshold value.

In the case of a network side device configuring channel state information interference measurement resources for multiple subframe groups, the network side may configure periodic channel state information interference measurement resources for different subframe groups in the multiple subframe groups, wherein with regard to different subframes, periods of the channel state information interference measurement resources may be the same, and also may be different; and the network side may also configure aperiodically triggered channel state information interference measurement resources for different subframes in the multiple subframe groups. In an example embodiment, the network side device may configure aperiodically triggered channel state information interference measurement resources for different subframe groups in the multiple subframe groups according to CSI measurement report trigger information. The CSI measurement report trigger information includes but is not limited to: a channel state information request (CSI request) in DCI.

In an example embodiment, the network side device may configure channel state information interference measurement resources which are located in different subframes for different subframe groups in the multiple subframe groups. Considering the problem of how to indicate different subframes, the network side device may indicate that channel state information interference measurement resources corresponding to different subframe groups in the multiple subframe groups are located in different subframes through different subframe offsets.

The network side may determine the multiple subframe groups in a semi-static or dynamic manner. In the case of a network side device determining the multiple subframe groups in the semi-static manner, the network side device may determine multiple subframe groups in a period of multiple radio frames (i.e. m times of the length of one radio frame, where m is a natural number larger than 1). In the case of the network side device determining multiple subframe groups in the dynamic manner, the network side device may determine the multiple subframe groups in a period of one radio frame. In an example embodiment, in a case where the network side device determines the multiple subframe groups in a semi-static manner, the network side configures the same set of multiple subframe groups for each radio frame in the multiple radio frames. That is, when the subframe groups are configured in the semi-static manner, with regard to each radio frame in multiple radio frames to be configured, they all use the same subframe groups for configuration.

In an example embodiment, the terminal device may determine CSI information corresponding to a subframe group to which a subframe where a channel state information interference measurement resource is located belongs according to one of the following manners:

1) after the terminal device receives CSI measurement report trigger information from a network side device, CSI corresponding to a subframe group to which a subframe, where the CSI measurement report trigger information is located, belongs is determined according to an interference measurement result which is corresponding to the subframe group to which this subframe belongs and is acquired on this subframe where the CSI measurement report trigger information is located; or 2) CSI corresponding to a subframe group to which a subframe, where the CSI measurement report trigger information is located, belongs is determined according to an interference measurement result which is corresponding to the subframe group to which this subframe belongs and is acquired before this subframe where the CSI measurement report trigger information is located; or 3) CSI corresponding to a subframe group to which a subframe, where the CSI measurement report trigger information is located, belongs is determined according to an interference measurement result which is corresponding to the subframe group to which this subframe belongs and is acquired after this subframe where the CSI measurement report trigger information is located, wherein the CSI measurement report trigger information includes but is not limited to: a channel state information request (CSI request) in downlink control information (DCI).

In an example embodiment, the terminal device executing the interference measurement by using the channel state information interference measurement resource includes the following steps.

S1: the terminal device executes the interference measurement by using the channel state information interference measurement resource.

S2: the terminal device determines a subframe group to which one or more subframes where the channel state information interference measurement resource is located belong according to the configuration information, and uses the measurement result obtained by executing the interference measurement as the measurement result of the determined subframe group.

S3: the terminal device determines CSI corresponding to the subframe group to which one or more subframes where the channel state information interference measurement resource is located belong according to the measurement result.

S4: the terminal device sends the CSI to a network side device.

In the above-mentioned step S4, the terminal device may but is not limited to send the CSI to the network side device through one of the following manners:

1) the terminal device sends the CSI to the network side device through a physical uplink control channel (PUCCH) or physical uplink shared channel (PUSCH) on an uplink subframe providing ACK/NACK feedback for downlink transmission of a subframe where the channel state information interference measurement resource is located;

2) the terminal device sends the CSI to the network side device through a PUCCH or PUSCH on the first uplink subframe which locates after a subframe where the channel state information interference measurement resource is located and of which an interval between this uplink subframe and the subframe where the channel state information interference measurement resource is located is greater than or equal to n, where n is a natural number greater than or equal to 3; and 3) the terminal device assumes the subframe where the channel state information interference measurement resource is located as an uplink subframe, and the terminal device sends the CSI to the network side device through the PUCCH or PUSCH on an uplink retransmission subframe corresponding to this subframe.

Figure 7:
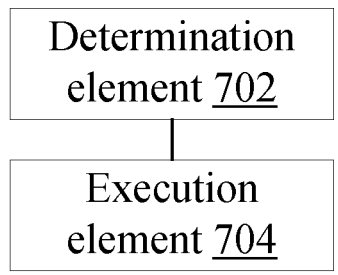
FIG. 7 is an example structural block diagram of an apparatus for measuring CSI located in a terminal device according to an embodiment of the disclosure.

An embodiment also provides an apparatus for measuring CSI, wherein the apparatus is configured to realize the above-mentioned embodiments and example embodiments, and there is no further description for what has been described already. As used in the following, the term "element" or "component" is a combination of software and/or hardware which can realize predetermined functions. Although the device described in the following embodiment is preferably realized by software, the realization by hardware or the combination of software and hardware is also possible and conceived. FIG. 7 is example structural block diagram of an apparatus for measuring CSI located in a terminal device according to an embodiment of the disclosure. As shown in FIG. 7, the CSI measurement apparatus includes: a determination element 702 and an execution element 704, and the structure is described below.

The determination element 702 is configured to determine whether a subframe where a channel state information interference measurement resource is located is a downlink subframe.

The execution element 704 is coupled to the determination element 702 and configured to execute interference measurement by using the above-mentioned channel state information interference measurement resource when a determination result of the determination element is that the subframe where the channel state information interference measurement resource is located is a downlink subframe.

In an example embodiment, the above-mentioned determination element 702 may be configured to determine whether the subframe where the channel state information interference measurement resource is located is a downlink subframe through at least one of the following manners:

1) determining whether the subframe where the channel state information interference measurement resource is located is the downlink subframe according to uplink-downlink configuration information received from a network side device;

2) determining whether the subframe where the channel state information interference measurement resource is located is the downlink subframe according to downlink scheduling information which is received from the network side device and corresponding to the subframe where the channel state information interference measurement resource is located;

3) determining whether the subframe where the channel state information interference measurement resource is located is the downlink subframe according to a downlink control channel on the subframe where the channel state information interference measurement resource received from the network side device is located, wherein as an example embodiment, the above-mentioned determination element 702 may be configured to determine whether the subframe where the channel state information interference measurement resource is located is the downlink subframe according to a physical downlink control channel (PDCCH) on the subframe where the channel state information interference measurement resource received from the network side device is located; and 4) determining whether the subframe where the channel state information interference measurement resource is located is the downlink subframe according to CSI measurement report trigger information which is received from the network side device and corresponding to the subframe where the channel state information interference measurement resource is located.

Figure 8:
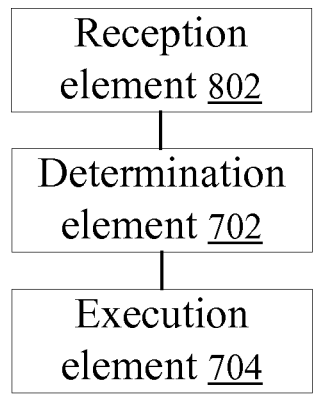
FIG. 8 is another example structural block diagram of an apparatus for measuring CSI located in a terminal device according to an embodiment of the disclosure.

In an example embodiment, as shown in FIG. 8, the above-mentioned apparatus for measuring CSI which is located in a terminal device may further include: a reception element 802, coupled to the determination element 702 and configured to receive configuration information sent by a network side device before determining whether a subframe where the channel state information interference measurement resource is located is a downlink subframe, wherein the configuration information is used for indicating channel state information interference measurement resources configured for multiple subframe groups by the network side device, and each subframe group in the multiple subframe groups includes one or more subframes.

Figure 9:
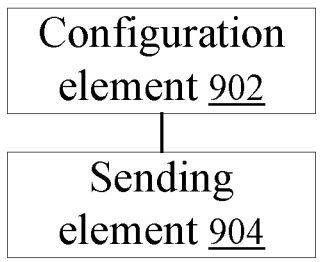
FIG. 9 is an example structural block diagram of an apparatus for measuring CSI located in a network side device according to an embodiment of the disclosure.

Another embodiment further provides an apparatus for measuring CSI which is located in a network side device. As shown in FIG. 9, apparatus for measuring CSI includes: a configuration element 902, configured to configure channel state information interference measurement resources for multiple subframe groups; a sending element 904, coupled to the configuration element 902 and configured to send configuration information to the terminal device for instructing the terminal device to execute interference measurement when a subframe where a channel state information interference measurement resource is located is a downlink subframe.

In an example embodiment, the above-mentioned apparatus may further include: a grouping element, wherein the grouping element includes: a first grouping component, configured to determine, in a case of determining the multiple subframe groups in a semi-static manner, the multiple subframe groups in a period of multiple radio frames; and a second grouping component, configured to determine, in a case of determining the multiple subframe groups in a dynamic manner, the multiple subframe groups in a period of one radio frame.

To make the objectives, technical solutions, and advantages of the disclosure clearer and more explicit, the following further describes in detail the technical solutions of the disclosure with reference to several specific example embodiments. It should be noted that the embodiments in this application and the characteristics of the embodiments could be combined randomly with each other if there is no conflict.

Example Embodiment 1

Figure 1:
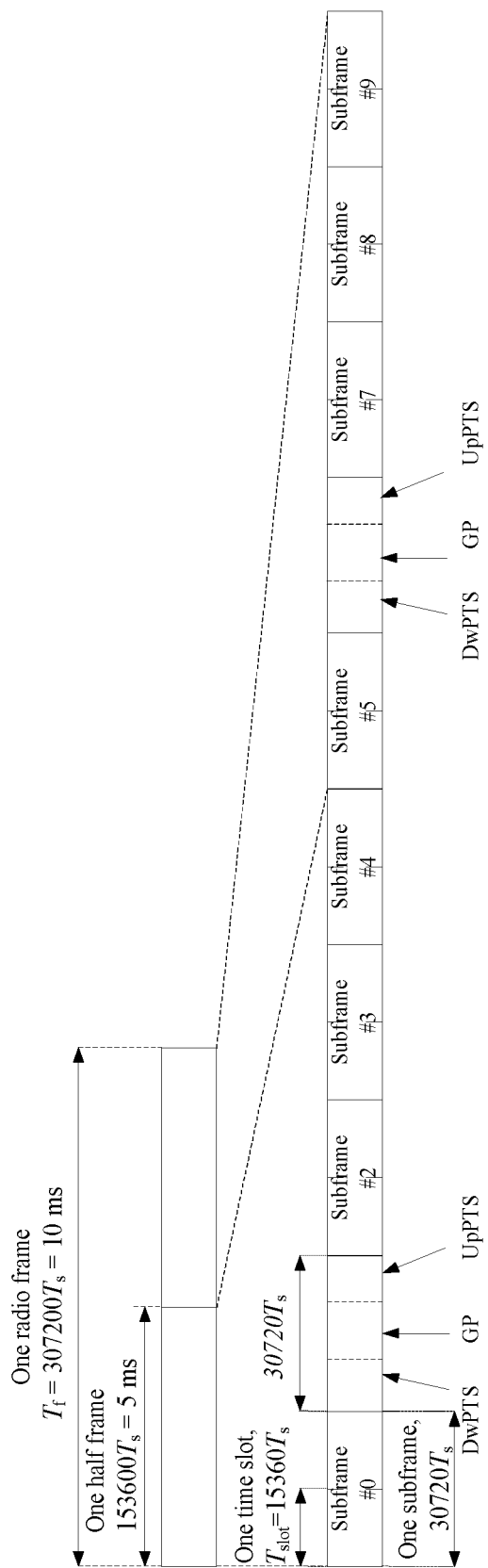
FIG. 1 is a schematic diagram showing the frame structure of an LTE TDD system according to the related art.
Figure 2:
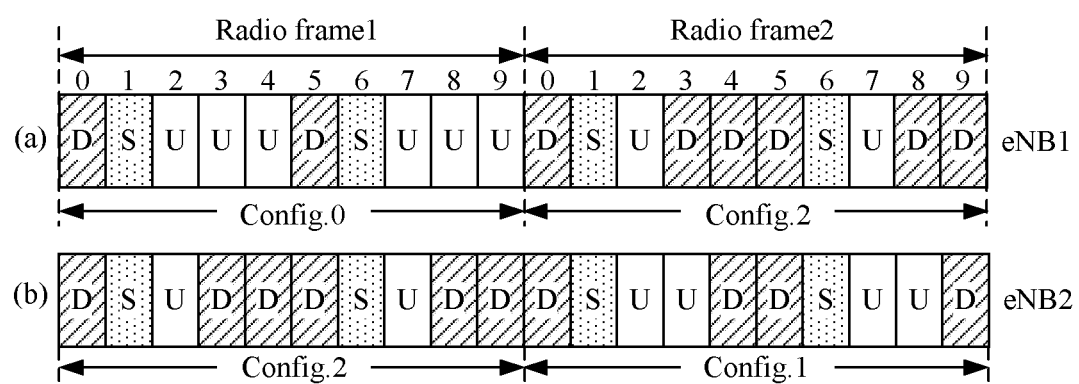
FIG. 2 is a schematic diagram of a base station flexibly adjusting uplink-downlink configuration according to the related art.
Figure 3:
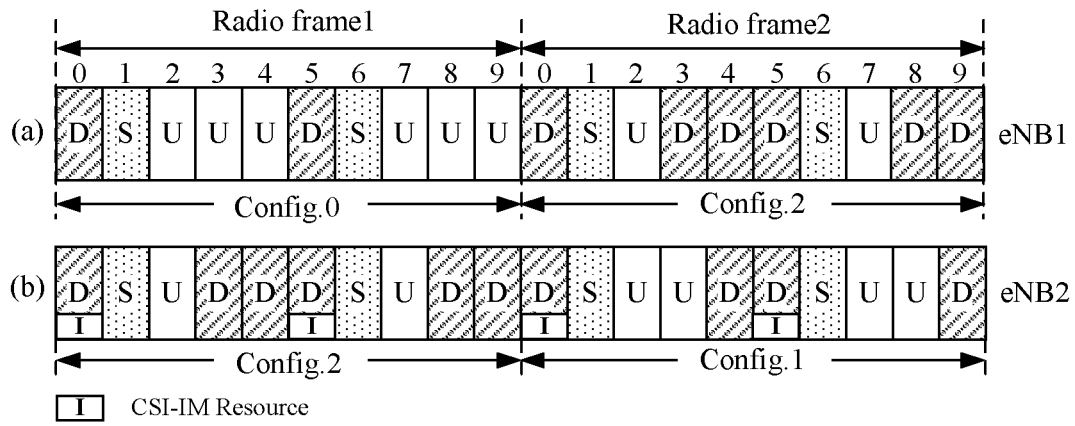
FIG. 3 is a schematic diagram of a data frame in a method for measuring CSI according to related art.
Figure 4:
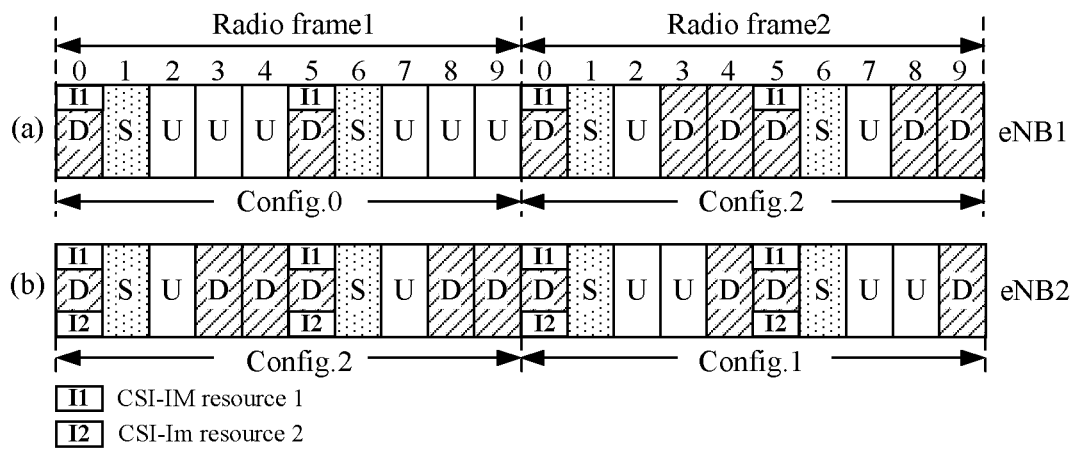
FIG. 4 is a schematic diagram of a data frame in another method for measuring CSI according to related art.

As shown in FIG. 2, in FIG. 2 (*a*), an eNB1 respectively uses uplink-downlink configuration Config. 0 and Config. 2 in radio frame #1 and radio frame #2, and in FIG. 2 (*b*), an eNB2 respectively uses uplink-downlink configuration Config. 2 and Config. 1 in radio frame #1 and radio frame #2.

In the example embodiment, taking the eNB2 as an example, the eNB2 may use the following manners to determine multiple subframe groups (taking two subframe groups as an example for description in the embodiment, i.e. the multiple subframe groups at least including a first subframe group and a second subframe group).

Manner 1: the eNB2 statically determines multiple subframe groups, and one or more downlink subframes of which a transmission direction is fixed to be downlink are taken as a first subframe group, and one or more subframes of which a transmission direction allows to be adjusted are taken as a second subframe group. It can be seen from the above-mentioned table 1 that in different uplink-downlink configurations, subframes 0/1/5/6 are fixed to be used for downlink traffic transmission, subframe 2 is fixed to be used for uplink traffic transmission, and subframes 3/4/7/8/9 are either used for uplink traffic transmission or used for downlink traffic transmission, that is to say, the transmission direction of subframes 3/4/7/8/9 allows adjustments. Assuming that the eNB2 may flexibly select uplink-downlink configuration from 7 types of uplink-downlink configurations as shown in table 1 as a radio frame structure thereof for traffic transmission, then the eNB2 may take subframes 0/1/5/6 in each radio frame as the first frame group, and take subframes 3/4/7/8/9 in each radio frame as the second frame group.

Manner 2: the eNB2 semi-statically determines multiple subframe groups in a period of multiple radio frames, wherein according to uplink-downlink configuration of the first radio frame in a current period, one or more downlink subframes of which a transmission direction is fixed to be downlink are taken as a first subframe group, and one or more downlink subframes of which a transmission direction allows adjustments are taken as a second subframe group. Then according to uplink-downlink configuration Config. 2 used by radio frame #1, the eNB2 takes subframes 0/1/5/6 of which a transmission direction is fixed to be downlink as the first subframe group, and takes downlink subframes 3/4/8/9 of which a transmission direction allows adjustments as the second subframe group.

Manner 3: the eNB2 semi-statically determines multiple subframe groups in a period of multiple radio frames, wherein according to uplink-downlink configuration of the first radio frame in a current period, one or more downlink subframes, which are configured to be one or more downlink transmission subframes by an eNB2 and one or more subframes at a location corresponding to which are also configured to be one or more downlink transmission subframes by an eNB (assuming to be eNB1) of which a distance between the eNB1 and the eNB2 is less than a preset threshold value, are taken as a first subframe group, and one or more downlink subframes, which are configured to be one or more downlink transmission subframes by an eNB2 but one or more subframes at a location corresponding to which are configured to be one or more uplink transmission subframes by the eNB1 of which a distance between the eNB1 and the eNB2 is less than a preset threshold value, are taken as a second subframe group. Then according to the uplink-downlink configuration Config. 2 used by the eNB2 in radio frame #1, and the uplink-downlink configuration Config. 0 used by eNB1 in radio frame #1, downlink subframes 0/1/5/6 are taken as a first subframe group, and downlink subframes 3/4/8/9 are taken as a second subframe group.

Manner 4: the eNB2 semi-statically determines multiple subframe groups in a period of multiple radio frames, wherein according to channel state information (for example, a modulation coding scheme, wherein each modulation coding scheme in a system corresponds to one index, and subsequent grouping judgement is performed according the index corresponding to the modulation coding scheme) measured and reported by a terminal device, one or more downlink subframes of which the channel state information (i.e. an index of the modulation coding scheme) is less than a preset threshold are taken as a first subframe group, and one or more downlink subframes of which the channel state information is more than the preset threshold are taken as a second subframe group. With regard to downlink subframes of which the channel state information is less than the preset threshold, a base station considers that these subframes are affected by larger interference; while with regard to downlink subframes of which the channel state information is more than the preset threshold, the base station considers that these subframes are affected by smaller interference. For example, the eNB2 may take subframes 0/1/5/6 as a first subframe group and take subframes 3/4/7/8/9 as a second subframe group according to channel state information measured and reported by a terminal device.

Manner 5: the eNB2 dynamically determines multiple subframe groups in a period of one radio frame, wherein according to uplink-downlink configuration of a current radio frame, one or more downlink subframes of which a transmission direction is fixed to be downlink are taken as a first subframe group, and one or more downlink subframes of which a transmission direction allows adjustments are taken as a second subframe group. Then with regard to Radio frame #1, the uplink-downlink configuration used thereof is Config. 2, and the eNB2 takes downlink subframes 0/1/5/6 of which a transmission direction is fixed to be downlink as a first subframe group, and takes downlink subframes 3/4/8/9 of which the transmission direction allows adjustments as a second subframe group. With regard to Radio frame #2, the uplink-downlink configuration used thereof is Config. 1, and the eNB2 takes downlink subframes 0/1/5/6 of which the transmission direction is fixed to be downlink as the first subframe group, and takes downlink subframes 4/9 of which the transmission direction allows adjustments as the second subframe group.

Manner 6: the eNB2 dynamically determines multiple subframe groups in a period of one radio frame, wherein according to uplink-downlink configuration of a current radio frame, one or more downlink subframes, which are configured to be one or more downlink transmission subframes by an eNB2 and one or more subframes at a location corresponding to which are also configured to be one or more downlink transmission subframes by an eNB (assuming to be eNB1) of which a distance between the eNB1 and the eNB2 is less than a preset threshold value, are taken as a first subframe group, and one or more downlink subframes, which are configured to be one or more downlink transmission subframes by an eNB2 but one or more subframes at a location corresponding to which are configured to be one or more uplink transmission subframes by the eNB1 of which a distance between the eNB1 and the eNB2 is less than a preset threshold value, are taken as a second subframe group. Then with regard to Radio frame #1, the uplink-downlink configuration used by the eNB2 is Config. 2, and the uplink-downlink configuration used by the eNB1 is Config. 0; and the eNB2 takes downlink subframes 0/1/5/6 as a first subframe group, and takes downlink subframes 3/4/8/9 as a second subframe group. With regard to Radio frame #2, the uplink-downlink configuration used by the eNB2 is Config. 1, and the uplink-downlink configuration used by the eNB1 is Config. 2; and the eNB2 takes downlink subframes 0/1/4/5/6/9 as the first subframe group, and the second subframe group is empty or there is no second subframe group.

Example Embodiment 2

In the example embodiment, it mainly introduces how a terminal device determines whether a subframe where a channel state information interference measurement resource is located is a downlink subframe, and the following describes several specific determination manners.

Manner 1: the terminal device determines whether the transmission direction of a subframe where a channel state information interference measurement resource is located in a current radio frame is downlink according to uplink-downlink configuration information (as shown in table 1) received from a base station, including whether the transmission direction is D or S, wherein if the transmission direction is D or S, then the terminal device determines the subframe to be a downlink subframe.

Manner 2: a terminal device determines whether the subframe where the channel state information interference measurement resource is located is the downlink subframe according to downlink scheduling information received from a base station. For example, with regard to multi-subframe scheduling, the base station may send downlink scheduling information of multiple downlink subframes through a downlink control channel of a certain downlink subframe, and if a terminal device receives downlink scheduling information corresponding to a subframe where a channel state information interference measurement resource is located which is sent by the base station, then the terminal determines the subframe to be a downlink subframe; and with regard to single subframe scheduling, the base station sends downlink scheduling information of a current downlink subframe through a downlink control channel of the current downlink subframe, and if the terminal device acquires the downlink scheduling information by detecting the downlink control channel of the current subframe, then the terminal determines the subframe to be a downlink subframe.

Manner 3: the terminal device detects a downlink control channel (for example, a physical downlink control channel (PDCCH)) of a subframe where a channel state information interference measurement resource is located, and if the downlink control channel is detected successfully, the terminal device determines the subframe to be a downlink subframe.

Manner 4: a terminal device determines whether a subframe is a downlink subframe and has a channel state information interference measurement resource according to CSI measurement report trigger information received from a base station. If the terminal device receives CSI measurement report trigger information corresponding to a subframe from the base station, then the terminal device determines that the subframe is a downlink subframe and has a channel state information interference measurement resource; or if the terminal acquires the CSI measurement report trigger information by detecting a downlink control channel of a subframe, then the terminal device determines that the subframe is a downlink subframe and has the channel state information interference measurement resource.

Example Embodiment 3

Figure 10:
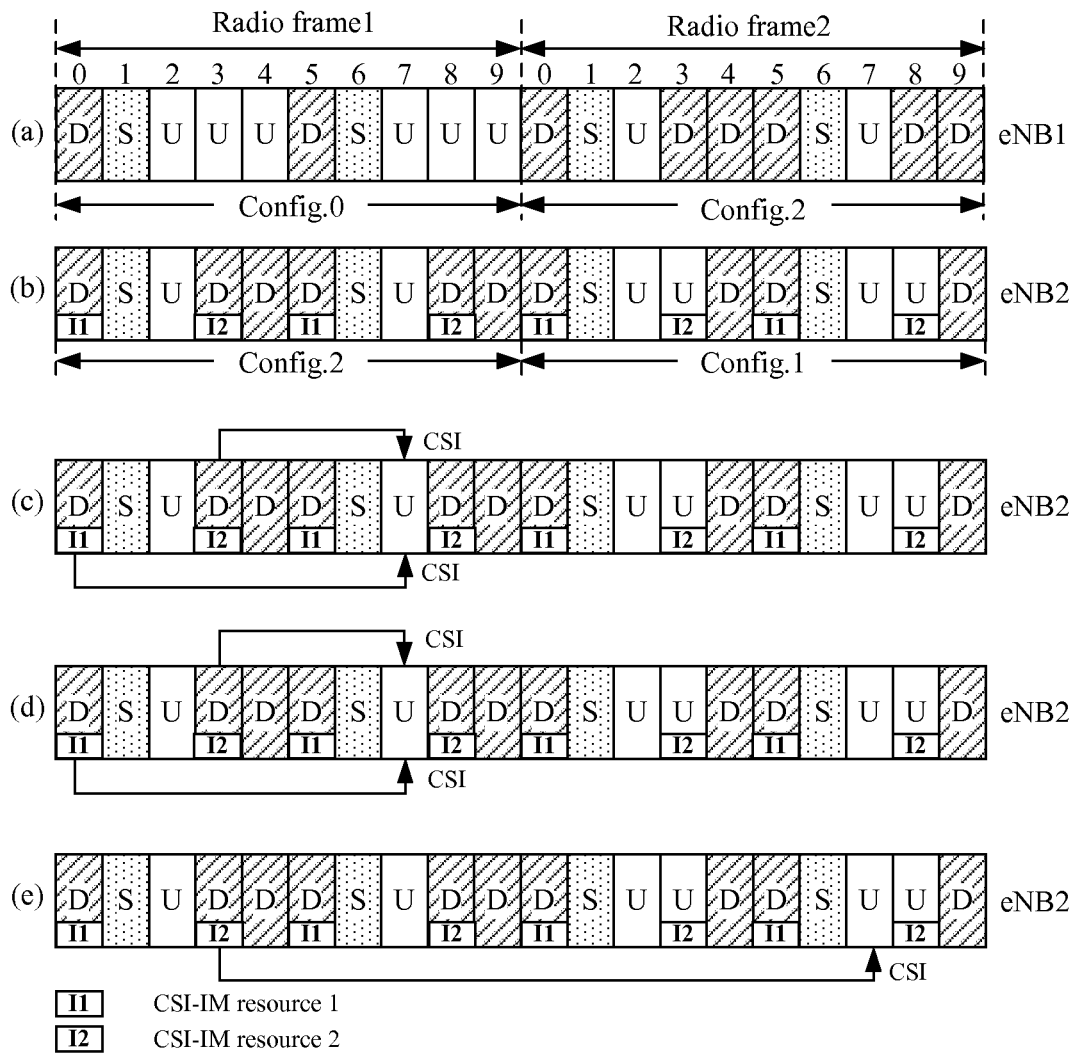
FIG. 10 is a schematic diagram of a data frame in a method for measuring CSI according to an example embodiment 3 of the disclosure.

As shown in FIG. 10, the uplink-downlink configuration of an eNB1 as shown in FIG. 10 (*a*) and the uplink-downlink configuration of an eNB2 as shown in FIG. 10 (*b*) are the same as that in FIG. 2.

In the embodiment, the eNB2 semi-statically determines different subframe groups in a period of two times of the length of one radio frame (i.e. 20 ms) according to the manner 2 or manner 3 in the example embodiment 1. In the current Radio frame #1 and Radio frame #2, the eNB2 determines subframes 0/1/5/6 for downlink transmission in each radio frame to be the first subframe group, and determines subframes 3/4/8/9 for downlink transmission in each radio frame to be the second subframe group.

The eNB2 configures a CSI-IM resource 1 for the first subframe group, i.e. the eNB2 configures the CSI-IM resource of which a period is 5 ms on subframes 0 and 5 of each radio frame, for a terminal to execute interference measurement on the first subframe group.

The eNB2 configures a CSI-IM resource 2 for the second subframe group, i.e. the eNB2 configures the CSI-IM resource of which a period is 5 ms on subframes 3 and 8 of each radio frame, for the terminal to execute interference measurement on the second subframe group.

The eNB2 sends CSI-IM resource configuration information corresponding to different subframe groups to the terminal for the terminal to execute interference measurement and acquire interference measurement results as well as CSI corresponding to different subframe groups.

The eNB2 sends information of different subframe groups to the terminal for the terminal to determine to which subframe group a subframe where the CSI-IM resource is located belongs.

The terminal receives the CSI-IM resource configuration information and the information of different subframe groups, executes interference measurement by using the CSI-IM resource on a subframe where the CSI-IM resource is located, and acquires an interference measurement result corresponding to a subframe group to which a subframe where the CSI-IM resource is located belongs. This procedure is described in detail as follows.

The terminal determines subframe 0, where the CSI-IM resource is located, in the Radio frame #1 to be a downlink subframe, then the terminal executes interference measurement by using the CSI-IM resource and acquires an interference measurement result corresponding to a first subframe group to which the subframe belongs.

The terminal determines subframe 3, where the CSI-IM resource is located, in the Radio frame #1 to be a downlink subframe, then the terminal executes interference measurement by using the CSI-IM resource and acquires an interference measurement result corresponding to a second subframe group to which the subframe belongs.

The terminal determines subframe 5, where the CSI-IM resource is located, in the Radio frame #1 to be a downlink subframe, then the terminal executes interference measurement by using the CSI-IM resource and acquires an interference measurement result corresponding to a first subframe group to which the subframe belongs.

The terminal determines subframe 8, where the CSI-IM resource is located, in the Radio frame #1 to be a downlink subframe, then the terminal executes interference measurement by using the CSI-IM resource and acquires an interference measurement result corresponding to a second subframe group to which the subframe belongs.

The terminal determines subframe 0, where the CSI-IM resource is located, in the Radio frame #2 to be a downlink subframe, then the terminal executes interference measurement by using the CSI-IM resource and acquires an interference measurement result corresponding to a first subframe group to which the subframe belongs.

The terminal determines that subframe 3, where the CSI-IM resource is located, in the Radio frame #2 is not a downlink subframe, then the terminal does not execute interference measurement on the subframe.

The terminal determines subframe 5, where the CSI-IM resource is located, in the Radio frame #2 to be a downlink subframe, then the terminal executes interference measurement by using the CSI-IM resource and acquires an interference measurement result corresponding to a first subframe group to which the subframe belongs.

The terminal determines that subframe 8, where the CSI-IM resource is located, in the Radio frame #2 is not a downlink subframe, then the terminal does not execute interference measurement on the subframe.

In the above, the terminal may determine whether a subframe where the CSI-IM resource is located is a downlink subframe in the following manner: the terminal determining whether the subframe is a downlink subframe according to uplink-downlink configuration information received from a base station; or, the terminal determining whether the subframe is a downlink subframe according to downlink scheduling information corresponding to the subframe which is received from the base station; or, the terminal determining whether the subframe is a downlink subframe according to a downlink control channel (for example, a physical downlink control channel (PDCCH)) on the subframe or downlink control information (DCI) received from the base station.

The terminal may determine CSI corresponding to different subframe groups in the following manner: the terminal determining, according to an interference measurement result which is acquired from a subframe where the CSI-IM resource is located and is corresponding to a subframe group to which the subframe belongs, CSI corresponding to the subframe group. For example:

the terminal determines CSI corresponding to the first subframe group according to an interference measurement result which is acquired on subframe 0 of the Radio frame #1 and is corresponding to the first subframe group to which the subframe 0 belongs; and/or the terminal determines CSI corresponding to the second subframe group according to an interference measurement result which is acquired on subframe 3 of the Radio frame #1 and is corresponding to the second subframe group to which the subframe 3 belongs.

The terminal sends the determined CSI corresponding to different subframe groups to the eNB2, so that the eNB2 can use the CSI for downlink adaptation transmission. The terminal may send the determined CSI corresponding to different subframe groups to the eNB2 in the following manners.

The terminal sends the determined CSI corresponding to a subframe group to which a subframe where the CSI-IM resource is located belongs to the eNB2 through a PUCCH or PUSCH on an uplink subframe providing ACK/NACK feedback for downlink transmission of the subframe where the CSI-IM resource is located. As shown in FIG. 10 (*c*), the CSI measurement report of subframe 0 and subframe 3 of the Radio frame #1 is taken as an example:

the terminal sends determined CSI corresponding to the first subframe group to the eNB2 through a PUCCH or PUSCH on an uplink subframe (i.e. subframe 7 of the Radio frame #1) providing ACK/NACK feedback for downlink transmission of subframe 0 of the Radio frame #1;

the terminal sends determined CSI corresponding to the second subframe group to the eNB2 through a PUCCH or PUSCH on an uplink subframe (i.e. subframe 7 of the Radio frame #1) providing ACK/NACK feedback for downlink transmission of subframe 3 of the Radio frame #1.

Alternatively, the terminal may also send determined CSI corresponding to a subframe group to which a subframe where the CSI-IM resource is located belongs to the eNB2 through a PUCCH or PUSCH on the first uplink subframe which locates after the subframe where the CSI-IM resource is located and has an interval from the subframe where the CSI-IM resource is located being greater than or equal to n (n is a natural number greater than or equal to 3). As shown in FIG. 10 (*d*), the CSI measurement report of subframe 0 and subframe 3 of the Radio frame #1 is taken as an example, and n is assumed to be 4:

the terminal sends determined CSI corresponding to the first subframe group to the eNB2 through a PUCCH or PUSCH on the first uplink subframe (i.e. subframe 7 of the Radio frame #1) which is after subframe 0 of the Radio frame #1 and has an interval from subframe 0 being greater than or equal to 4;

the terminal sends determined CSI corresponding to the second subframe group to the eNB2 through a PUCCH or PUSCH on the first uplink subframe (i.e. subframe 7 of the Radio frame #1) which is after subframe 3 of the Radio frame #1 and has an interval from subframe 3 being greater than or equal to 4.

Alternatively, the terminal may also send determined CSI of a subframe group to which a subframe where the CSI-IM resource is located belongs to the eNB2 through a PUCCH or PUSCH on an uplink retransmission subframe corresponding to the subframe where the CSI-IM resource is located when assuming that the subframe where the CSI-IM resource is located is an uplink subframe. As shown in FIG. 10 (*e*), the CSI measurement report of subframe 3 of the Radio frame #1 is taken as an example:

when assuming that subframe 3 of the Radio frame #1 is an uplink subframe, the terminal sends determined CSI corresponding to the second subframe group to the eNB2 through a PUCCH or PUSCH on an uplink retransmission subframe corresponding to the subframe 3 (according to HARQ transmission rule of uplink-downlink configuration Config. 0, the retransmission subframe is subframe 7 of the Radio frame #2).

Example Embodiment 4

Figure 11:
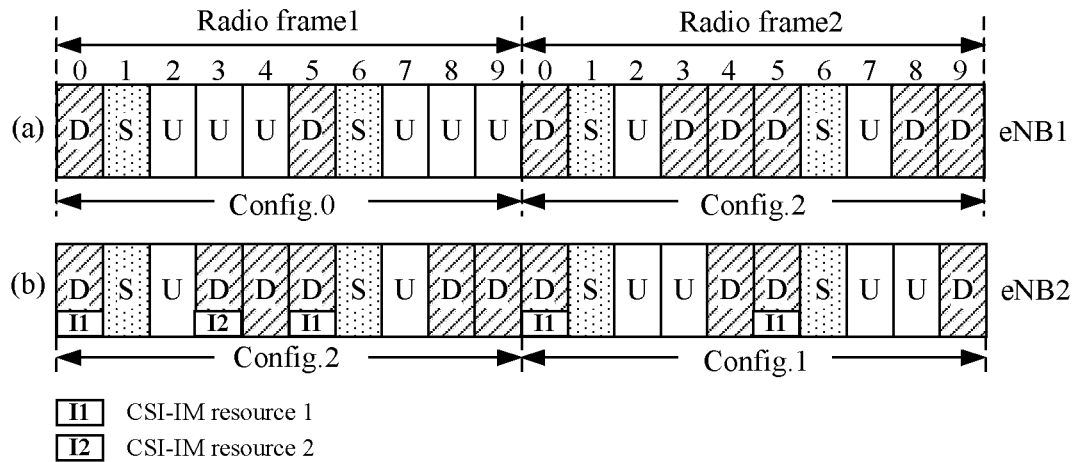
FIG. 11 is a schematic diagram of a data frame in a method for measuring CSI according to an example embodiment 4 of the disclosure.

As shown in FIG. 11, the uplink-downlink configuration of an eNB1 as shown in FIG. 11 (*a*) and the uplink-downlink configuration of an eNB2 as shown in FIG. 11 (*b*) are the same as that in FIG. 2.

In the embodiment, the eNB2 dynamically determines different subframe groups according to manner 6 in the example embodiment 1. With regard to Radio frame #1, the eNB2 determines subframes 0/1/5/6 for downlink transmission in the radio frame to be a first subframe group, and determines subframes 3/4/8/9 for downlink transmission in the radio frame to be a second subframe group. With regard to Radio frame #2, the eNB2 determines all the subframes for downlink transmission in the radio frame to be the first subframe group.

The eNB2 configures a CSI-IM resource 1 for the first subframe group, i.e. the eNB2 configures the CSI-IM resource of which a period is 5 ms on subframes 0 and 5 of each radio frame, for a terminal to execute interference measurement on the first subframe group.

The eNB2 configures an aperiodically triggered CSI-IM resource 2 for the second subframe group, i.e. the eNB2 triggers to configure the CSI-IM resource on subframe 3 of the Radio frame #1 according to the CSI measurement report trigger information of a terminal, for the terminal to execute interference measurement on the second subframe group. The CSI measurement report trigger information may be a CSI request in downlink control information (DCI) of the terminal.

The eNB2 sends CSI-IM resource configuration information corresponding to different subframe groups to the terminal for the terminal to execute interference measurement and acquire interference measurement results as well as CSI corresponding to different subframe groups.

The eNB2 sends CSI measurement report trigger information corresponding to subframe 3 of the Radio frame #1, for example, the eNB2 sends a CSI request to a terminal through a downlink control information (DCI), so as to notice the terminal to report a CSI measurement result of subframe 3 of Radio frame #1.

In the embodiment, the eNB2 needs not to send information of different subframe groups to the terminal, i.e. the information of different subframe groups is transparent to the terminal.

The terminal receives the CSI-IM resource configuration information, executes, by using the CSI-IM resource, interference measurement on a subframe where the CSI-IM resource is located, and acquires an interference measurement result corresponding to different subframe groups. Taking subframe 0 and subframe 3 of the Radio frame #1 as examples, this procedure includes:

the terminal determines subframe 0, where the CSI-IM resource is located, on the Radio frame #1 to be a downlink subframe, then the terminal executes interference measurement by using the CSI-IM resource and acquires an interference measurement result.

The terminal determines subframe 3, where the CSI-IM resource is located, on the Radio frame #1 to be a downlink subframe, then the terminal executes interference measurement by using the CSI-IM resource and acquires an interference measurement result.

The terminal may determine whether the subframe where the CSI-IM resource is located is a downlink subframe in the following manner: the terminal determines whether the subframe is a downlink subframe according to uplink-downlink configuration information received from a base station; or, the terminal determines whether the subframe is the downlink subframe according to downlink scheduling information corresponding to the subframe which is received from the base station; or, the terminal determines whether the subframe is the downlink subframe according to a downlink control channel (for example, a physical downlink control channel (PDCCH)) on the subframe or downlink control information (DCI) received from the base station; or, with regard to subframe 3 of the Radio frame #1, the terminal determines the subframe to be the downlink subframe according to the CSI measurement report trigger information corresponding to the subframe which is received from the base station.

The terminal may determine CSI in the following manner: the terminal determines corresponding CSI according to an interference measurement result in a subframe where the CSI-IM resource is located, for example:

the terminal determines corresponding CSI according to an interference measurement result acquired on subframe 0 of the Radio frame #1; and/or the terminal determines corresponding CSI according to an interference measurement result acquired on subframe 3 of the Radio frame #1.

The terminal sends the determined CSI to the eNB2, so that the eNB2 can use the CSI for downlink adaptation transmission. The process of sending the CSI is as the example embodiment 3.

The eNB2 determines CSI corresponding to different subframe groups according to the CSI received from the terminal, so as to use the CSI for performing downlink adaptation transmission on a subframe in the different subframe groups, for example:

the eNB2 determines a periodical CSI measurement report received from the terminal as the CSI corresponding to the first subframe group, which is used for performing downlink adaptation transmission on a subframe in the first subframe group; and/or the eNB2 determines a CSI measurement report which is aperiodically triggered and received from the terminal as the CSI corresponding to the second subframe group, which is used for performing downlink adaptation transmission on a subframe in the second subframe group.

Example Embodiment 5

In the example embodiment, it mainly describes how to execute the method for measuring CSI provided by the embodiments of the disclosure in the case of a base station using another uplink-downlink configuration based on a specific embodiment.

Figure 12:
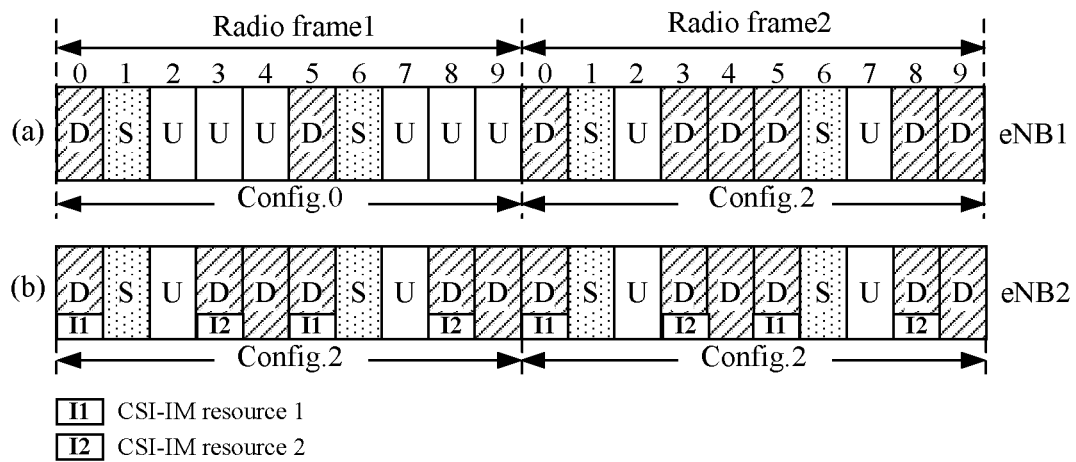
FIG. 12 is a schematic diagram of a data frame in a method for measuring CSI according to an example embodiment 5 of the disclosure.

As shown in FIG. 12, an eNB1 respectively uses uplink-downlink configuration Config. 0 and Config. 2 in radio frame #1 and radio frame #2 in FIG. 12 (*a*), and an eNB2 uses uplink-downlink configuration Config. 2 in both radio frame #1 and radio frame #2 in FIG. 12 (*b*).

In the embodiment, the eNB2 semi-statically determines different subframe groups in a period of two times of the length of one radio frame (i.e. 20 ms) according to the manner 2 or manner 3 in the example embodiment 1. In the current Radio frame #1 and Radio frame #2, the eNB2 determines subframes 0/1/5/6 for downlink transmission in each radio frame to be the first subframe group, and subframes 3/4/8/9 for downlink transmission in each radio frame to be the second subframe group.

The eNB2 configures a CSI-IM resource 1 for the first subframe group, i.e. the eNB2 configures the CSI-IM resource of which a period is 5 ms on subframes 0 and 5 of each radio frame, for a terminal to execute interference measurement on the first subframe group.

The eNB2 configures a CSI-IM resource 2 for the second subframe group, i.e. the eNB2 configures the CSI-IM resource of which a period is 5 ms on subframes 3 and 8 of each radio frame, for the terminal to execute interference measurement on the second subframe group.

The eNB2 sends CSI-IM resource configuration information corresponding to different subframe groups to the terminal for the terminal to execute interference measurement and acquire interference measurement results as well as CSI corresponding to different subframe groups.

The eNB2 sends information of different subframe groups to the terminal for the terminal to determine to which subframe group a subframe where the CSI-IM resource is located belongs.

The terminal receives the CSI-IM resource configuration information and the subframe group information, executes interference measurement by using the CSI-IM resource on a subframe where the CSI-IM resource is located, and acquires an interference measurement result corresponding to a subframe group to which the subframe where the CSI-IM resource is located belongs. For example:

the terminal determines subframe 0, where the CSI-IM resource is located, on the Radio frame #1 to be a downlink subframe, then the terminal executes interference measurement by using the CSI-IM resource and acquires an interference measurement result corresponding to a first subframe group to which the subframe belongs; and the terminal determines subframe 3, where the CSI-IM resource is located, on the Radio frame #1 to be a downlink subframe, then the terminal executes interference measurement by using the CSI-IM resource and acquires an interference measurement result corresponding to a second subframe group to which the subframe belongs.

The terminal may determine whether the subframe where the CSI-IM resource is located is a downlink subframe in the following manner: the terminal determines whether the subframe is a downlink subframe according to uplink-downlink configuration information received from a base station; or, the terminal determines whether the subframe is the downlink subframe according to downlink scheduling information corresponding to the subframe which is received from the base station; or, the terminal determines whether the subframe is the downlink subframe according to a downlink control channel (for example, a physical downlink control channel (PDCCH)) on the subframe or downlink control information (DCI) received from the base station.

The terminal may determine CSI corresponding to different subframe groups in the following manner: the terminal determines CSI corresponding to a subframe group according to an interference measurement result which is acquired from a subframe where the CSI-IM resource is located and is corresponding to the subframe group to which the subframe belongs, for example:

the terminal determines CSI corresponding to the first subframe group according to an interference measurement result which is acquired on subframe 0 on the Radio frame #1 and is corresponding to the first subframe group to which the subframe 0 belongs; and/or the terminal determines CSI corresponding to the second subframe group according to an interference measurement result which is acquired on subframe 3 on the Radio frame #1 and is corresponding to the second subframe group to which the subframe 3 belongs.

The terminal sends the determined CSI corresponding to different subframe groups to the eNB2 so that the eNB2 can use the CSI for downlink adaptation transmission, and the process is as described in the example embodiment 3.

Example Embodiment 6

Figure 13:
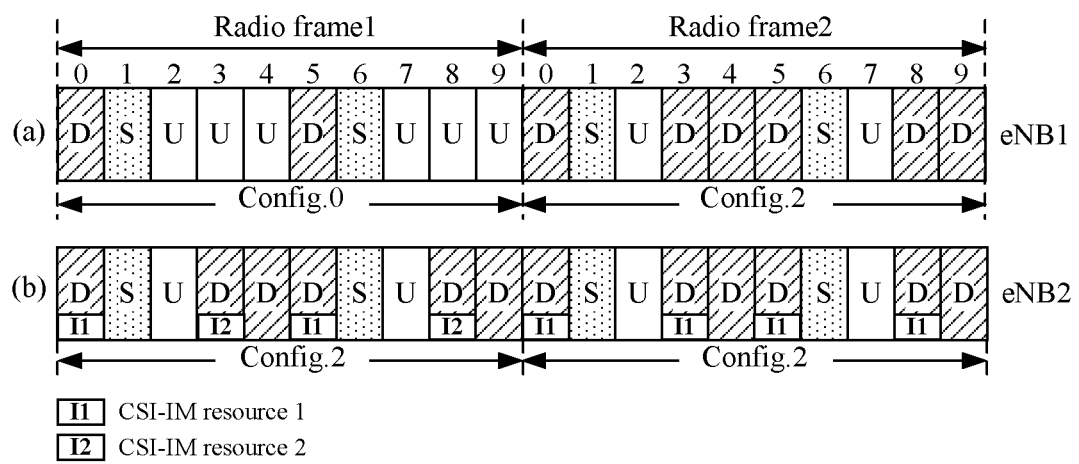
FIG. 13 is a schematic diagram of a data frame in a method for measuring CSI according to an example embodiment 6 of the disclosure.

As shown in FIG. 13, the uplink-downlink configuration of an eNB1 as shown in FIG. 13 (*a*) and the uplink-downlink configuration of an eNB2 as shown in FIG. 13 (*b*) are the same as that in FIG. 12.

In the embodiment, the eNB2 dynamically determines different subframe groups according to manner 6 in the example embodiment 1. With regard to Radio frame #1, the eNB2 determines subframes 0/1/5/6 for downlink transmission in the radio frame to be a first subframe group, and determines subframes 3/4/8/9 for downlink transmission in the radio frame to be a second subframe group. With regard to Radio frame #2, the eNB2 determines all the subframes for downlink transmission in the radio frame to be the first subframe group.

The eNB2 configures a CSI-IM resource with a period being 5 ms on subframes 0 and 5 of each radio frame, and configures a CSI-IM resource with a period being 5 ms on subframes 3 and 8 of each radio frame.

The eNB2 sends CSI-IM resource configuration information to the terminal for the terminal to execute interference measurement and acquire interference measurement results as well as CSI corresponding to different subframe groups.

The eNB2 sends information of different subframe groups to the terminal for the terminal to determine to which subframe group a subframe where the CSI-IM resource is located belongs.

The terminal receives the CSI-IM resource configuration information and the subframe group information, executes interference measurement by using the CSI-IM resource on a subframe where the CSI-IM resource is located, and acquires an interference measurement result corresponding to a subframe group to which the subframe where the CSI-IM resource is located belongs, for example:

with regard to subframe 0, where the CSI-IM resource is located, on the Radio frame #1, the terminal determines the subframe to be a downlink subframe and the subframe belongs to the first subframe group, then the terminal executes interference measurement by using the CSI-IM resource and acquires an interference measurement result corresponding to the first subframe group to which the subframe belongs;

with regard to subframe 3, where the CSI-IM resource is located, on the Radio frame #1, the terminal determines the subframe to be a downlink subframe and the subframe belongs to the second subframe group, then the terminal executes interference measurement by using the CSI-IM resource and acquires an interference measurement result corresponding to the second subframe group to which the subframe belongs;

while with regard to subframe 3, where the CSI-IM resource is located, in the Radio frame #2, the terminal determines the subframe to be a downlink subframe and the subframe belongs to the first subframe group, then the terminal executes interference measurement by using the CSI-IM resource and acquires an interference measurement result corresponding to the first subframe group to which the subframe belongs.

The terminal may determine whether a subframe where a CSI-IM resource is located is a downlink subframe in the following manner: the terminal determines whether the subframe is a downlink subframe according to uplink-downlink configuration information which is received from the base station; or, the terminal determines whether the subframe is the downlink subframe according to downlink scheduling information corresponding to the subframe which is received from the base station; or, the terminal determines whether the subframe is the downlink subframe according to a downlink control channel (for example, a physical downlink control channel (PDCCH)) on the subframe or downlink control information (DCI) received from the base station.

The terminal may determine CSI corresponding to different subframe groups in the following manner: the terminal determines CSI corresponding to a subframe group according to an interference measurement result which is acquired from a subframe where the CSI-IM resource is located and is corresponding to the subframe group to which the subframe belongs, for example:

the terminal determines CSI corresponding to the first subframe group according to an interference measurement result which is acquired on subframe 0 on the Radio frame #1 and is corresponding to the first subframe group to which the subframe 0 belongs; and/or the terminal determines CSI corresponding to the second subframe group according to an interference measurement result which is acquired on subframe 3 on the Radio frame #1 and is corresponding to the second subframe group to which the subframe 3 belongs;

while with regard to an interference measurement result which is acquired on subframe 3 of the Radio frame #2 and corresponding to the first subframe group where the subframe belongs, this interference measurement result could be used for the terminal to determine the CSI corresponding to the first subframe group.

The terminal sends the determined CSI corresponding to different subframe groups to the eNB2, so that the eNB2 can use the CSI for downlink adaptation transmission, and the process is as described in the example embodiment 3.

In the above-mentioned various example embodiments, a terminal device implements interference measurement when one or more subframes where channel state information interference measurement resources corresponding to different subframe groups are located are one or more downlink subframes, CSI corresponding to different subframe groups is acquired and reported to a network side device, which solves the CSI measurement problem caused by a base station flexibly adjusting uplink-downlink configuration in a related technology, thereby achieving the effect of improving the data transmission performance of a system.

In another embodiment, software is also provided, and the software is used to execute the above-mentioned embodiments or the technical solution described in the example embodiments.

In another embodiment, a storage medium is also provided, wherein the storage medium stores the above-mentioned software, and the storage medium includes but is not limited to an optical disk, a soft disk, a hard disk, an erasable storage, etc.

It should be noted that in the methods and apparatuses for measuring CSI described in the above-mentioned various embodiments and example embodiments as well as in corresponding software and storage medium, the channel state information interference measurement resources may be CSI-IM resources configured based on a zero-power channel state information reference signal, and also may be other types of channel state information interference measurement resources.

It can be seen from the above description that the disclosure realizes the following technical effects: the terminal device firstly determines whether a subframe where the channel state information interference measurement resource is located is a downlink subframe, and only in the case of determining that the subframe where the channel state information interference measurement resource is located is a downlink subframe, will the terminal execute interference measurement on the channel state information interference measurement resource. By means of the above-mentioned manner, the technical problem is solved that it is difficult to effectively perform the CSI measurement caused when a base station flexibly adjust uplink-downlink configuration in a related technology, thereby achieving the technical effect of improving the data transmission performance of a system.

Apparently, those skilled in the art shall understand that the above components and steps of the present disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. In this way, the present disclosure is not restricted to any particular hardware and software combination.

The above description is only example embodiments of the present disclosure and is not intended to limit the present disclosure, and the present disclosure can have a variety of changes and modifications for ordinary person skilled in the field. Any modification, equivalent replacement, or improvement made within the principle of the present disclosure shall all fall within the protection scope defined by the claims of the present disclosure.

What is claimed is:

1. A method for measuring channel state information (CSI), comprising:
   a terminal device receiving configuration information from a network side device, wherein the configuration information is used for indicating channel state information interference measurement resources configured for multiple subframe groups by the network side device, and each subframe group in the multiple subframe groups comprises one or more subframes;
   the terminal device receiving at least one of the following first information from the network side device: uplink-downlink configuration information, downlink control information (DCI);
   the terminal device determining a subframe where a channel state information interference measurement resource is located is a downlink subframe, according to the configuration information and the first information;

the terminal device executing interference measurement by using the channel state information interference measurement resource within the downlink subframe.

2. The method according to claim 1, wherein the terminal device determining a subframe where a channel state information interference measurement resource is located is a downlink subframe, according to the configuration information and at least one of the following information:
   downlink scheduling information which is received from the network side device and corresponding to the subframe where the channel state information interference measurement resource is located;
   a downlink control channel on the subframe where the channel state information interference measurement resource received from the network side device is located; and
   CSI measurement report trigger information which is received from the network side device and corresponding to the subframe where the channel state information interference measurement resource is located.

3. The method according to claim 1, wherein the multiple subframe groups comprise: a first subframe group and a second subframe group; wherein
   the first subframe group comprises one or more downlink subframes of which a transmission direction is fixed to be downlink; and the second subframe group comprises one or more subframes of which a transmission direction allows to be adjusted; or,
   the first subframe group comprises one or more subframes which are configured to be one or more downlink transmission subframes by a current network side device, wherein one or more subframes at a location corresponding to the one or more downlink transmission subframes are also configured to be one or more downlink transmission subframes by a network side device of which the distance between this network side device and the current network side device is less than a preset threshold value; and the second subframe group comprises one or more subframes which are configured to be one or more downlink transmission subframes by a current network side device, wherein one or more subframes at a location corresponding to the one or more downlink transmission subframes are configured to be one or more uplink transmission subframes by a network side device of which the distance between this network side device and the current network side device is less than the preset threshold value; or,
   the first subframe group comprises one or more downlink subframes on which channel state information measured and reported by a terminal device is less than a preset threshold, and the second subframe group comprises one or more downlink subframes on which channel state information measured and reported by the terminal device is more than the preset threshold.

4. The method according to claim 1, wherein the channel state information interference measurement resources configured for the multiple subframe groups by the network side device comprise at least one of the following:
   periodic channel state information interference measurement resources configured for different subframe groups in the multiple subframe groups by the network side device; and
   aperiodically triggered channel state information interference measurement resources configured for different subframe groups in the multiple subframe groups by the network side device.

5. The method according to claim 1, wherein the channel state information interference measurement resources configured for the multiple subframe groups by the network side device comprise: the channel state information interference measurement resources configured for different subframe groups in the multiple subframe groups by the network side device are located in different subframes.

6. The method according to claim 5, wherein the channel state information interference measurement resources configured for different subframe groups in the multiple subframe groups by the network side device are located in different subframes which are indicated by different subframe offsets.

7. The method according to claim 1, wherein
   in a case where the multiple subframe groups are determined by the network side device in a semi-static manner, the multiple subframe groups are determined by the network side device in a period of multiple radio frames; and
   in a case where the multiple subframe groups are determined by the network side device in a dynamic manner, the multiple subframe groups are determined by the network side device in a period of one radio frame.

8. The method according to claim 7, wherein in the case where the multiple subframe groups are determined by the network side device in the semi-static manner, the multiple subframe groups configured by the network side device for each radio frame in the multiple radio frames are the same.

9. The method according to claim 1, wherein the configuration information is further used for indicating one or more subframes, which are configured with a channel state information interference measurement resource, in each subframe group of the multiple subframe groups, and/or indicating a subframe group to which each subframe configured with the channel state information interference measurement resource belongs.

10. The method according to claim 9, wherein the terminal device executing the interference measurement by using the channel state information interference measurement resource comprises:
    the terminal device executing the interference measurement by using the channel state information interference measurement resource; and
    the terminal device determining a subframe group to which a subframe where the channel state information interference measurement resource is located belongs according to the configuration information, and using the measurement result obtained by executing the interference measurement as a measurement result of the determined subframe group.

11. The method according to claim 10, wherein after the terminal device determines the subframe group to which the subframe where the channel state information interference measurement resource is located belongs according to the configuration information, and uses the measurement result obtained by executing the interference measurement as the measurement result of the determined subframe group, the method further comprises:
    the terminal device determining CSI corresponding to the subframe group to which the subframe where the channel state information interference measurement resource is located belongs according to the measurement result; and
    the terminal device sending the CSI to a network side device.

12. The method according to claim 11, wherein the terminal device sending the CSI to the network side device comprises one of the following:
   the terminal device sending the CSI to the network side device through a physical uplink control channel (PUCCH) or physical uplink shared channel (PUSCH) on an uplink subframe providing ACK/NACK feedback for downlink transmission of a subframe where the channel state information interference measurement resource is located;
   the terminal device sending the CSI to the network side device through a PUCCH or PUSCH on the first uplink subframe which locates after a subframe where the channel state information interference measurement resource is located and of which an interval between this uplink subframe and the subframe where the channel state information interference measurement resource is located is greater than or equal to n, where n is a natural number greater than or equal to 3; and
   the terminal device assuming the subframe where the channel state information interference measurement resource is located as an uplink subframe, and the terminal device sending the CSI to the network side device through the PUCCH or PUSCH on an uplink retransmission subframe corresponding to this subframe.

13. The method according to claim 1, wherein the channel state information interference measurement resource is a channel state information-interference measurement (CSI-IM) resource configured based on a zero-power channel state information reference signal.

14. A method for measuring channel state information (CSI), comprising:
   a network side device configuring channel state information interference measurement resources for multiple subframe groups; and
   the network side device sending configuration information to a terminal device; and
   the network side device sending at least one of the following first information to the terminal device: uplink-downlink configuration information, downlink control information (DCI);
   wherein the configuration information and the first information are used for instructing the terminal device to determine a subframe where a channel state information interference measurement resource is located is a downlink subframe and to execute interference measurement by using the channel state information interference measurement resource within the downlink subframe.

15. The method according to claim 14, wherein the multiple subframe groups comprise: a first subframe group and a second subframe group;
   wherein the first subframe group comprises one or more downlink subframes of which a transmission direction is fixed to be downlink, and the second subframe group comprises one or more subframes of which a transmission direction allows to be adjusted; or,
   the first subframe group comprises one or more subframes which are configured to be one or more downlink transmission subframes by a current network side device, wherein one or more subframes at a location corresponding to the one or more downlink transmission subframes are also configured to be one or more downlink transmission subframes by a network side device of which the distance between this network side device and the current network side device is less than a preset threshold value; and the second subframe group comprises one or more subframes which are configured to be one or more downlink transmission subframes by a current network side device, wherein one or more subframes at a location corresponding to the one or more downlink transmission subframes are configured to be one or more uplink transmission subframes by a network side device of which the distance between this network side device and the current network side device is less than the preset threshold value; or,
   the first subframe group comprises one or more downlink subframes on which channel state information measured and reported by a terminal device is less than a preset threshold, and the second subframe group comprises one or more downlink subframes on which channel state information measured and reported by the terminal device is more than the preset threshold.

16. The method according to claim 14, wherein the network side device configuring the channel state information interference measurement resources for the multiple subframe groups comprises at least one of the following:
   the network side device configuring periodic channel state information interference measurement resources for different subframe groups in the multiple subframe groups; and
   the network side device configuring aperiodically triggered channel state information interference measurement resources for different subframe groups in the multiple subframe groups.

17. The method according to claim 14, wherein the network side device configuring the channel state information interference measurement resources for the multiple subframe groups comprises: the network side device configuring channel state information interference measurement resources located in different subframes for different subframe groups in the multiple subframe groups.

18. The method according to claim 17, wherein the network side device indicates that channel state information interference measurement resources corresponding to different subframe groups in the multiple subframe groups are located in different subframes by using different subframe offsets.

19. The method according to claim 14, wherein
   in a case of determining the multiple subframe groups in a semi-static manner, the network side device determining the multiple subframe groups in a period of multiple radio frames; and
   in a case of determining the multiple subframe groups in a dynamic manner, the network side device determining the multiple subframe groups in a period of one radio frame.

20. The method according to claim 14, wherein the configuration information is further used for indicating one or more subframes, which are configured with a channel state information interference measurement resource, in each subframe group of the multiple subframe groups, and/or indicating a subframe group to which each subframe configured with the channel state information interference measurement resource belongs.

21. The method according to claim 14, wherein the channel state information interference measurement resource is a channel state information-interference measurement (CSI-IM) resource configured based on a zero-power channel state information reference signal.

22. An apparatus for measuring channel state information (CSI), wherein the CSI measurement apparatus is located in a terminal device and comprises:
   a reception element, configured to receive configuration information from a network side device, wherein the configuration information is used for indicating channel state information interference measurement resources configured for multiple subframe groups by the network side device, and each subframe group in the multiple subframe groups comprises one or more subframes;
   a determination element, configured to receive at least one of the following first information from the network side device: uplink-downlink configuration information, downlink control information (DCI), and according to the configuration information and the first information, determine a subframe where a channel state information interference measurement resource is located is a downlink subframe; and
   an execution element, configured to execute interference measurement by using the channel state information interference measurement resource within the downlink subframe.

23. The apparatus according to claim 22, wherein the determination element determine a subframe where a channel state information interference measurement resource is located is a downlink subframe, according to the configuration information and at least one of the following information:
   downlink scheduling information which is received from the network side device and corresponding to the subframe where the channel state information interference measurement resource is located;
   a downlink control channel on the subframe where the channel state information interference measurement resource received from the network side device is located;
   CSI measurement report trigger information which is received from the network side device and corresponding to the subframe where the channel state information interference measurement resource is located.

24. An apparatus for measuring channel state information (CSI), wherein the CSI measurement apparatus is located in a network side device and comprises:
   a configuration element, configured to configure channel state information interference measurement resources for multiple subframe groups; and
   a sending element, configured to send configuration information to a terminal device, and send at least one of the following first information to the terminal device: uplink-downlink configuration information, downlink control information (DCI);
   wherein the configuration information and the first information are used for instructing the terminal device to determine a subframe where a channel state information interference measurement resource is located is a downlink subframe and to execute interference measurement by using the channel state information interference measurement resource within the downlink subframe.

25. The apparatus according to claim 24, further comprising: a grouping element, wherein the grouping element comprises:
   a first grouping component, configured to determine, in a case of determining the multiple subframe groups in a semi-static manner, the multiple subframe groups in a period of multiple radio frames; and
   a second grouping component, configured to determine, in a case of determining the multiple subframe groups in a dynamic manner, the multiple subframe groups in a period of one radio frame.

* * * * *